Dec. 30, 1952     M. E. THOMAS     2,623,938

SEISMOMETER

Filed March 21, 1949

INVENTOR.
M. E. THOMAS

Patented Dec. 30, 1952

2,623,938

UNITED STATES PATENT OFFICE 2,623,938

SEISMOMETER

Marion E. Thomas, Bartlesville, Okla., assignor to Phillips Petroleum Company, a corporation of Delaware Application March 21, 1949, Serial No. 82,539

4 Claims. (Cl. 177—352)

This invention relates to seismometers. In another aspect, it relates to seismometers in which two relatively movable assemblies are connected by a torsion member so arranged that the seismometer has no resonant frequencies within the seismic band.

Seismometers of the inertia type include a support which is carried by the earth and which is responsive to movement thereof, this support having an inertia body suspended therefrom so that movement of the support relative to the inertia body produces relative movement between a pickup coil and a magnetic core structure, thereby to induce an electrical current in the pickup coil which is representative of the earth movements. Heretofore, the suspension of the inertia body from the support has ordinarily been effected by spiral flat springs. When the seismometer is used to detect low frequency earth movements, the spiral flat springs oftentimes have an extraneous resonant frequency which is within the frequency range of seismic waves. Such unwanted resonance conditions may occur through vibration of the center part of the spring legs with the ends remaining approximately stationary. In other cases, higher modes of independent spring resonances are found to occur within the seismic frequency range. It has also been found that seismometers of this type oftentimes have a resonant frequency which varies with the amplitude of vibration. This is believed to result from the static load impressed upon the spring by the inertia body which may cause the inertia body to be supported, at least in part, by tension in the spring legs, rather than by true cantilever action.

It is an object of this invention to improve the construction and operation of seismometers.

It is a further object to provide a seismometer utilizing a torsion wire suspension for the inertia body so that there are no resonant frequencies within the seismic frequency band.

It is a further object to provide a torsion wire suspension in which the static load of the inertia body on the torsion element is compensated for by an initial torsional strain impressed on the torsion member so that, when the seismometer support is displaced relative to the inertia body, the torsion element operates in a linear part of its range resulting in independence of the resonant frequency from the amplitude of vibration.

It is a still further object to provide a seismometer which is compact, rugged in construction, easily adjustable, and which may readily be manufactured at a low cost.

Various other objects, advantages and features of the invention will become apparent from the following description, taken in conjunction with the accompanying drawings, in which.

Figure 1:
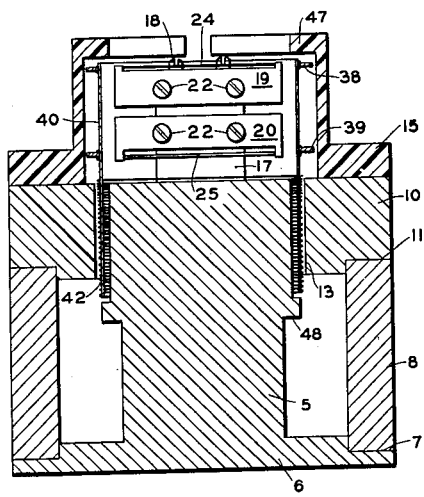
Figure 1 is a vertical sectional view of the seismometer.
Figure 2:
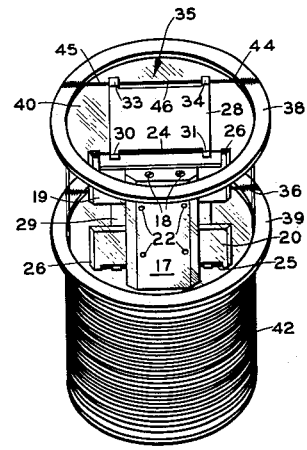
Figure 2 is a perspective view of the support, torsion assembly, and coil assembly.
Figure 3:
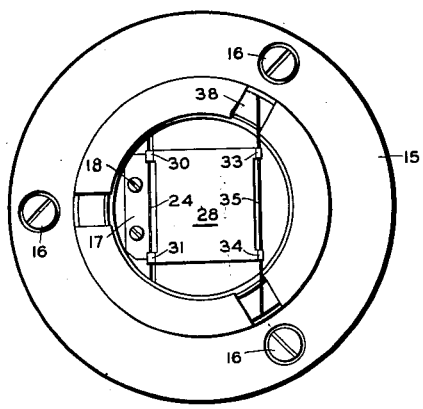
Figure 3 is a top view of the seismometer shown by Figure 1.

Referring now to the drawings in detail, and particularly to Figure 1, the seismometer comprises a magnetic core piece 5 of generally cylindrical construction having a radially extending base 6 which is provided with a circumferential flange 7 for receiving an annular permanent magnet 8 which, preferably, is formed from an aluminum, nickel, cobalt alloy. The magnet 8, in turn, supports an annular magnetic pole piece 10 having a flanged portion 11 engaging the top surface of the magnet. It will be apparent that the assembly just described forms a closed magnetic circuit and the pole pieces 5, 10 define an air gap 13 in this magnetic circuit, said gap being of circular configuration.

A casing 15 of insulating material is carried by the upper surface of pole piece 10, and the entire assembly is held together by screws 16 extending vertically through the outer region of the magnetic structure. An upright support 17 is secured to the casing 15 by screws 18 and this support, in turn, carries a pair of vertically spaced horizontal plates 19 and 20 which are secured thereto by screws 22. The plates 19, 20 support torsion wires 24 and 25, respectively, each wire having its ends secured to lugs 26 formed on the plates 19 and 20. Thus, the torsion wires 24, 25 are supported at their ends and have freely suspended central portions.

These wires have secured thereto a pair of thin metal plates 28 and 29, respectively. Preferably, each plate 28, 29 has a pair of lugs 30, 31 formed thereon which are brazed or otherwise suitably secured to the central portion of the respective torsion wires. If desired, however, the plates may be secured to only one part of the wire, or, alternatively, they may be secured to the wire throughout their length. The plates 28, 29 are preferably formed from beryllium copper and they afford some spring action which, however, is not essential to the operation of the invention.

The plates 28, 29 have lugs 33, 34 formed on the edge opposite that carrying the lugs 30 and 31. These lugs are brazed or otherwise suitably secured to the central portion of torsion wires 35 and 36, respectively, which have their ends secured to circular flanged members 38 and 39, these members being carried by and secured to a cylinder 40 of a suitable insulating material, such as mica. The lower portion of the cylinder 40 carries a coil 42 which extends downwardly into the air gap 13. The terminal portions of the coil may extend upwardly to the flanges 38, 39 which form a convenient electrical connection to the coil or, alternatively, the electrical connection may be made through the wires 35, 36, plates 28, 29 and wires 24, 25 to the supports 19 and 20.

In the operation of the seismometer, the inertia or coil assembly including the cylinder 40, coil 42 and associated parts, is supported in a predetermined position relative to the magnet assembly by the torsion in wires 24, 25, 35 and 36, in which position the pickup coil 42 is supported within air gap 13 between the pole pieces 5 and 10. It will be noted that only the end portions of the torsion wires are effective in supporting the inertia body and that this function is not performed by the middle portion. Thus, with respect to torsion wire 35, for example, the effective portion for supporting the inertia assembly exists only in the end portions 44, 45 and not in the central portion 46, which is located between the lugs 33 and 34. Of course, if a one point instead of a two point suspension is used, the entire torsion member will be under torsional strain.

In accordance with the invention, the end portions, such as portions 44 and 45, are given an initial torsional strain before assembly of the seismometer in a direction tending to move the coil assembly in an upward direction, Figure 1. When the seismometer is assembled, this initial strain is counterbalanced by the static weight of the coil assembly which causes it to assume the position shown in Figure 1 with the coil 42 disposed centrally within the air gap 13. This initial torsional strain has the additional advantage of insuring that the torsion elements operate in a linear part of their range when the magnetic structure is displaced relative to the inertia or coil assembly. That is, the strain produced in the torsion wires and, hence, the displacement of the magnetic assembly relative to the coil is directly proportional to the amplitude of vibration and does not vary as the amplitude is changed. The torsional suspension also inherently provides a structure wherein the resonant frequency of the spring suspension unit is completely outside the seismic frequency band, even at low seismic frequencies. As a result, operation of the seismometer is produced only by earth movement and the output of the seismometer is truly responsive to the seismic waves in the earth.

In operating the seismometer, the unit is placed on the ground at a position where it is desired to measure seismic waves and the terminals of coil 42 are connected to a suitable amplifier and recorder of a type well known to those skilled in the art. Seismic waves incident upon the seismometer cause the magnetic assembly 5, 8, 10 to move relative to the coil assembly 42, which remains in a stationary position due to its inertia. As a result, the coil cuts magnetic lines of force at air gap 13, with the result that a current is induced in the coil which is representative of the seismic waves. Excessive relative movement between the magnetic and coil assemblies, which might damage the spring suspension unit, is prevented by a flange 47 formed on casing 15 and by a flange 48 formed on magnetic pole piece 5. It is a feature of the invention that the coil assembly has a high ratio of active to inactive mass so that a seismometer of high efficiency is obtained.

Although I have described a preferred embodiment of the seismometer, the invention is not to be restricted to the particular modification shown. Thus, it is only necessary to utilize one set of torsion wires in some cases. For example, the wires 24, 25 might be eliminated and the edges of plates 28, 29 secured directly to the supports 19 and 20. Alternatively, the lower suspension 20, 25, 29, 36 may be eliminated and only the upper suspension unit used. Finally, the construction of the magnetic circuit may be varied, the essential condition being that a magnetic field be produced in the region of the pickup coil so that lines of force are cut by the coil responsive to relative movement between the magnetic assembly and coil assembly.

While the invention has been described in connection with a present, preferred embodiment thereof, it is to be understood that this description is illustrative only and is not intended to limit the invention, the scope of which is defined by the appended claims.

Having described my invention, I claim:

1. A seismometer comprising, in combination, two relatively movable assemblies, one of said assemblies including spaced pole pieces and a magnet for establishing a magnetic field between said pole pieces, the other assembly including a pickup coil positioned between said pole pieces, and means for interconnecting said assemblies including an elongated elastic torsion member having its ends secured to one of said assemblies and a freely suspended central portion, and a supporting member having one end secured to the other assembly and its other end secured to the central portion of said elastic member, whereby torsion in said elastic member maintains said assemblies in predetermined relative positions, from which they are displaced by mechanical shocks incident upon the seismometer.

2. A seismometer comprising, in combination, two relatively movable assemblies, one of said assemblies including spaced pole pieces and a magnet for establishing a magnetic field between said pole pieces, the other assembly including a pickup coil positioned between said pole pieces, and means for interconnecting said assemblies including an elongated elastic torsion member having its ends secured to one of said assemblies and a freely suspended central portion, and a supporting member having one end secured to the other assembly and its other end secured to the central portion of said elastic member, said member having an initial torsional strain applied thereto so that said assemblies are urged toward predetermined relative positions, the masses of said assemblies and the stiffness of said elastic torsion member being so adjusted that the system has no resonant frequency within the seismic band, said assemblies being displaced by mechanical shocks incident upon the seismometer, such displacement inducing an electrical current in the pickup coil, and stop members for limiting the relative movement between said assemblies.

3. A seismometer comprising, in combination, a generally cylindrical magnetic core having a radially protruding base, an annular permanent magnet carried by said base, an annular magnetic core piece mounted at the top of said magnet defining a circular air gap with said cylindrical core, a cylinder of insulating material having its lower portion positioned within said air gap, a coil carried by the lower portion of said cylinder, a pair of vertically spaced circumferential flanges at the top portion of said cylinder, a pair of torsion wires each having its ends secured to one of said flanges, a flat plate of spring material having one edge secured to the central portion of each torsion wire, a support carried by said cylindrical core, and a pair of vertically spaced, horizontally extending torsion wires carried by said support, each of said horizontally extending wires having another edge of one of said plates secured thereto, whereby the initial torsion in said wires supports said cylinder in such position that the coil is disposed in said air gap, the magnetic structure being displaced relative to said cylinder responsive to mechanical shocks incident upon the seismometer.

4. A seismometer comprising, in combination, a generally cylindrical magnetic core having a radially protruding base, an annular permanent magnet carried by said base, an annular magnetic core piece mounted at the top of said magnet defining a circular air gap with said cylindrical core, a cylinder of insulating material having its lower portion positioned within said air gap, a coil carried by the lower portion of said cylinder, a pair of vertically spaced circumferential flanges at the top portion of said cylinder, a pair of torsion wires each having its ends secured to one of said flanges, a flat plate of spring material having one edge secured to the central portion of each torsion wire, a support carried by said cylindrical core, a pair of vertically spaced, horizontally extending wires carried by said support, each of said horizontally extending wires having another edge of one of said plates secured thereto, whereby the initial torsion in said wires supports said insulating cylinder in such position that the coil is disposed in said air gap, the magnetic structure being displaced relative to said cylinder responsive to mechanical shocks incident upon the seismometer, a flange formed on said core to limit downward movement of the cylinder relative to the core, and a flange formed on said support for limiting the upward movement of the cylinder relative to said core.

MARION E. THOMAS.

REFERENCES CITED

The following references are of record in the file of this patent:

UNITED STATES PATENTS

| Number | Name | Date |
| --- | --- | --- |
| 378,552 | Orcutt | Feb. 28, 1888 |
| 1,749,015 | Bisbee | Mar. 4, 1930 |
| 2,021,330 | Ross | Nov. 19, 1935 |
| 2,297,251 | Schild | Sept. 29, 1942 |
| 2,417,077 | Hoover | Mar. 11, 1947 |
| 2,471,542 | Rich | May 31, 1949 |
| 2,487,029 | Piety | Nov. 1, 1949 |

FOREIGN PATENTS

| Number | Country | Date |
| --- | --- | --- |
| 274,575 | Great Britain | July 25, 1927 |